Dec. 5, 1961   E. L. DECKER   3,011,663
STORAGE AREA FOR REMOVABLE CARGO CONTAINERS
Filed April 27, 1959   2 Sheets-Sheet 2
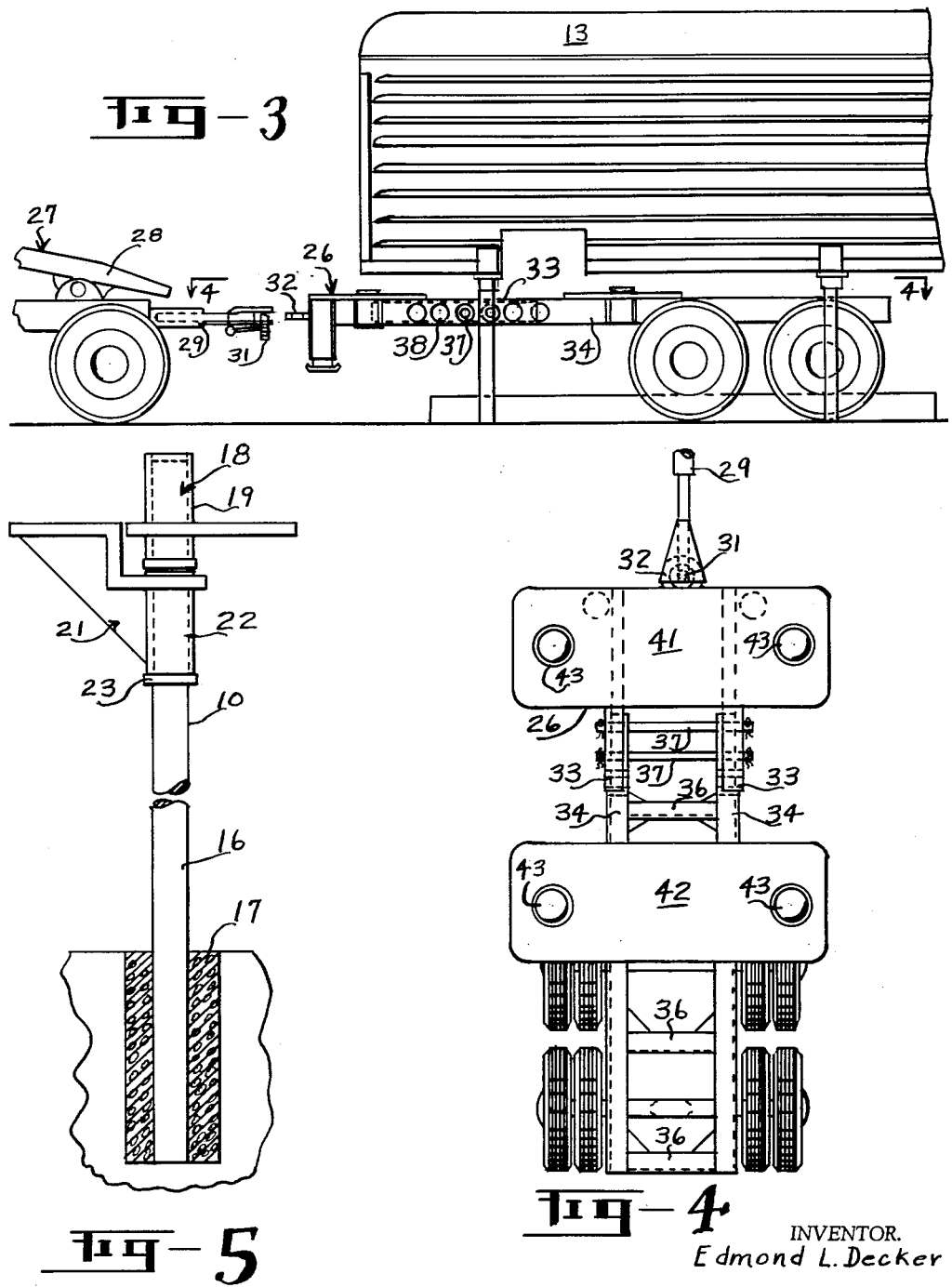
INVENTOR.
Edmond L. Decker
BY
Jennings, Carter & Thompson
Attorneys

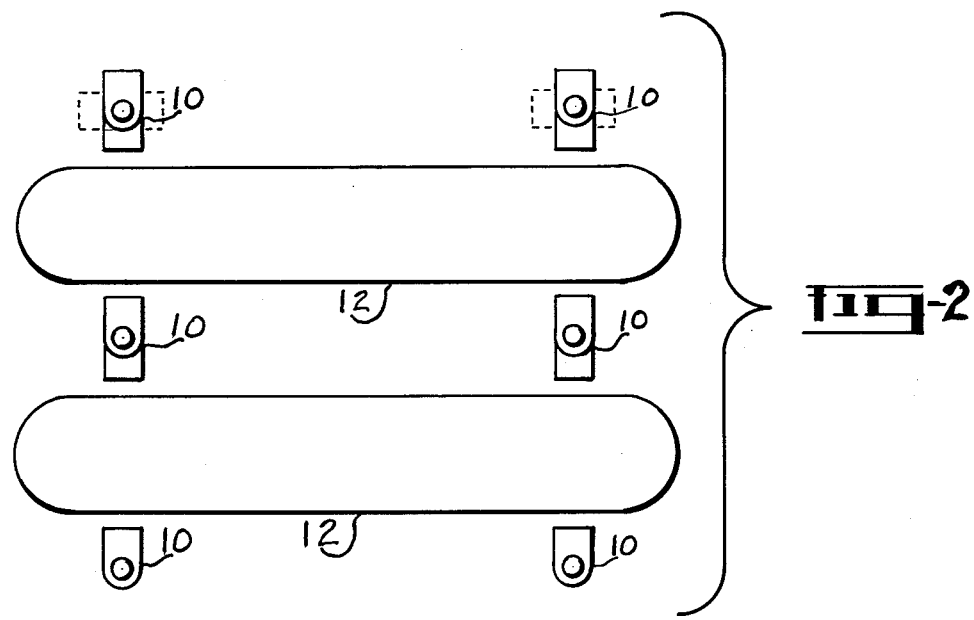
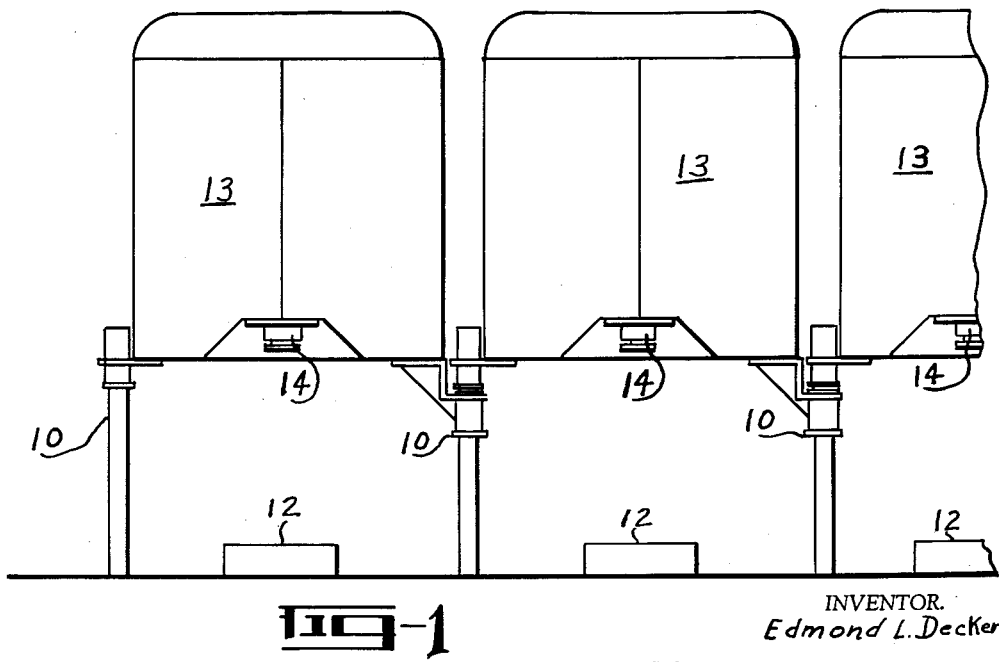

United States Patent Office 3,011,663
Patented Dec. 5, 1961

3,011,663
STORAGE AREA FOR REMOVABLE CARGO CONTAINERS
Edmond L. Decker, Birmingham, Ala., assignor to Russell W. Keiser, Birmingham, Ala.
Filed Apr. 27, 1959, Ser. No. 809,163
1 Claim. (Cl. 214—38)

This invention relates to a storage area for removable cargo containers, and more particularly to a storage area having rows of spaced fixed container supports between which a conveying vehicle may be driven to unload and load cargo containers.

Heretofore, in the art to which my invention applies, it has been common to provide retractable legs on removable cargo containers so that the containers can be separated from the trailer on which they are carried and rest on the legs while being loaded and unloaded, thereby freeing the trailer for additional functions.

The present invention provides rows of fixed container supports in a storage area with the rows being spaced a sufficient distance to allow a trailer carrying the cargo container to be driven between the rows. The container supports comprise a plurality of fixed posts each of which have a movable arm which may be positioned beneath the cargo container so that the container may be supported thereon to free the trailer. The cargo container need not be modified in any manner to be positioned on the container supports. The trailers may be backed under the container when it is desired to move the container to another location, and the container may be positioned on the trailer from the arms with the arms then being removed from beneath the container.

It is an object of the present invention to provide a storage area for removable cargo containers having at least two rows of vertically extending posts with the rows being spaced a sufficient distance to permit a trailer carrying the container to be positioned therebetween, and to provide support means on the posts movable beneath the cargo container so that the container may be supported thereon.

It is a further object of my invention to provide a trailer in combination with my storage area which comprises a frame having longitudinally extending pairs of telescoping frame members adjustably connected to each other for carrying cargo containers of different lengths with means providing relative vertical movement between the container and the trailer so that the container can be easily positioned on and removed from the movable support means by my trailer.

Apparatus embodying features of my invention is shown in the accompanying drawings, forming a part of this application, in which:

FIG. 1 is an end elevational view of a portion of my storage area having a plurality of rows of cargo container supports on which are mounted a plurality of removable cargo containers;

FIG. 2 is a plan view of the partial storage area shown in FIG. 2 with the cargo containers removed;

FIG. 3 is a side elevational view of a trailer being backed under a cargo container in my storage area;

FIG. 4 is a top plan view of the trailer in FIG. 3 shown detached from the tractor; and, FIG. 5 is an elevational view of a container support having arms thereon for supporting a cargo container.

Referring now to the drawings and more particularly to FIGS. 1 and 2, I show a storage area comprising a plurality of rows of spaced container supports 10. Each row has a pair of container supports 10. A concrete island 12 is positioned between adjacent rows and guides a conveying vehicle between the rows of the supports 10 so that it is properly centered between the rows. Cargo containers 13 are shown in FIG. 1 supported on my container supports 10. The cargo containers 13 are provided with a king pin 14 and may be of the type shown and described in my prior co-pending application Serial No. 740,346, filed June 6, 1958.

Referring to FIG. 5, I show one of my container supports 10 comprising a post 16 that is embedded in concrete 17 in the ground or other supporting surface. A rotatable arm 18 comprises a sleeve 19 that fits over the upper end of post 10. A second rotatable arm 21 is positioned beneath arm 18 and comprises a sleeve 22 which fits around post 16 and bears against an edge of flange 23 that is integral with post 16. The arms 18 and 21 may be easily rotated under a cargo container to support the same and may be removed from beneath the cargo container to allow the container to be removed. While the arms 18 and 21 are shown as being rotated manually, the arms could be rotated automatically by hydraulic means with a suitable lever to actuate the arms.

Referring to FIG. 3, I show a trailer indicated generally by the numeral 26 adapted to support a container 13 thereon. A tractor is partially shown at 27 for towing trailer 26 and has a fifth wheel 28 thereon adapted to receive the king pin 14 of container 13. Means (not shown) are provided to secure the container on trailer 26, such as a toggle clamp. A telescoping draw bar 29 extends rearwardly from tractor 27 and has a releasable spring mounted pintle pin 31 on an end thereof that is adapted to engage an eye 32 on trailer 26. Trailer 26 comprises pairs of longitudinally extending telescoping channels 33 and 34. Transverse beam members 36 extend between the pairs of channels. To connect the telescoping channels 33 and 34 to each other, connecting bars 37 are provided which extend through apertures 38 (see FIG. 3) in beams 33 and 34. A front support member 41 extends across channels 33 and a rear support member 42 extends across channels 34. The distance between the support members 41 and 42 may be varied by adjusting the telescoping connection between beams 33 and 34 thereby accommodating containers of different lengths. The container is supported on the support members 41 and 42 as well as the fifth wheel 28. Support members 41 and 42 overhang channels 33 and 34 and hydraulic jack means 43 is provided on each end of each of support members 41 and 42. The jack means 43 allow the containers to be moved relative to arms 18 and 21 on support 10 and relatively to trailer 26 for loading the container 13 onto the trailer and for unloading the container 13 onto supporting arms 18 and 21.

In operation, to remove container 13 as shown in FIG. 3, trailer 26 is backed between the rows of supports 10. The island 12 thus centers the trailer 26 beneath the cargo container 13 by guiding the wheels thereof. When trailer 26 has been properly positioned beneath container 13, hydraulic jacks 43 are actuated to lift container 13 from arms 18 and 21. The arms 18 and 21 are then rotated from beneath the container such as shown in the upper row of supports 10 shown in FIG. 2 in dotted lines. The king pin 14 on cargo container 13 engages fifth wheel 28 and the securing means (not shown) for securing the container onto the trailer 26 are actuated and, in this position, the container 13 is ready to be towed from my storage area to another location. To place a container on the support members 10 from the trailer, the trailer 26 with the container thereon is backed between the rows of supports 10, the arms 18 and 21 being retracted. Upon reaching the desired position, the securing means for the container is released and hydraulic jacks 43 are actuated to lift the container 13. In the lifted position, the arms 18 and 21 are swung beneath the container 13 and the hydraulic jacks 43 are lowered thereby allowing container 13 to be supported on arms 18 and 21. While the jack means have been shown as being on trailer 26, the arms 18 and 21 may be provided with elevating or jack means, if desired, thereby allowing the jack means on trailer 26 to be eliminated. Further, if desired, trailer 26 may be provided with a king pin to engage fifth wheel 28 and in this case, container 13 would not require a king pin.

While I have shown my invention in but one form, it will be obvious to persons skilled in the art that it is not so limited, but is susceptible of various changes and modifications without departing from the spirit thereof, and I desire, therefore, that only such limitations be placed thereupon as are specifically set forth in the appended claim.

What I claim is:

In combination, a trailer adapted to support and transport a cargo container thereon, said trailer comprising a frame having laterally spaced longitudinally extending pairs of telescoping frame members adjustably connected to each other and transverse support members secured to and overhanging the frame members, two rows of vertically extending posts spaced apart to permit the trailer with a cargo container thereon to be positioned therebetween, means positioned between the rows of posts to guide the wheels of a conveying vehicle so that the cargo container carried thereby may be centered between said rows, the upper end of each of said posts having a rotatable arm thereon mounted on a vertical axis and adapted to rotate under the cargo container for supporting a container thereon and to be removed from beneath the container to allow the container to be removed from the posts, the posts of at least one of said rows having a second rotatable arm thereon mounted on a vertical axis and adapted to be rotated oppositely from said first mentioned arm to support a cargo container, and hydraulic jack means on the outer overhanging ends of each of the support members to raise the container relative to the rotatable arms and the support members so that the container may be easily transferred between the trailer and the arms.

References Cited in the file of this patent

UNITED STATES PATENTS

| | | |
|---|---|---|
| 286,119 | Dale | Oct. 2, 1883 |
| 1,190,361 | Zwiebel | July 11, 1916 |
| 1,398,331 | Lightner et al. | Nov. 29, 1921 |
| 1,403,568 | Rodowicz | Jan. 17, 1922 |
| 1,594,494 | Callison | Aug. 3, 1926 |
| 1,989,920 | Fildes | Feb. 5, 1935 |
| 2,069,236 | Fitch | Feb. 2, 1937 |
| 2,172,244 | Grundler | Sept. 5, 1939 |
| 2,379,094 | Maxon | June 26, 1945 |
| 2,715,971 | Cox | Aug. 23, 1955 |
| 2,808,289 | Scoby | Oct. 1, 1957 |

FOREIGN PATENTS

| | | |
|---|---|---|
| 787,521 | Great Britain | Dec. 11, 1957 |